United States Patent [19]

Altobelli

[11] Patent Number: 5,163,640

[45] Date of Patent: Nov. 17, 1992

[54] ACTIVE SPIN AXIS CONTROL FOR SPINNING SPACE VEHICLES

[75] Inventor: Mark R. Altobelli, Culver City, Calif.

[73] Assignee: Hughes Aircraft Company, Los Angeles, Calif.

[21] Appl. No.: 627,272

[22] Filed: Dec. 14, 1990

[51] Int. Cl.⁵ .............................................. B64G 1/24
[52] U.S. Cl. ................................................ 244/164
[58] Field of Search ............ 244/158 R, 164, 169–172; 364/459

[56] References Cited

U.S. PATENT DOCUMENTS

| | | |
|---|---|---|
| 4,012,018 | 3/1977 | Lorell et al. |
| 4,471,926 | 9/1984 | Steel, III ............................ 244/164 |
| 4,657,210 | 4/1987 | Hubert et al. |
| 4,758,957 | 7/1988 | Hubert et al. ....................... 244/169 |

FOREIGN PATENT DOCUMENTS

| | | |
|---|---|---|
| 0225683 | 11/1986 | European Pat. Off. |
| 2040513A | 8/1980 | United Kingdom |

OTHER PUBLICATIONS

"Active Nutation Control for Spinning Solid Motor Upper Stages" by E. A. Webster dated 8-10 Jul. 1985.

*Primary Examiner*—Galen Barefoot
*Attorney, Agent, or Firm*—Gordon R. Lindeen, III; Steven M. Mitchell; Wanda K. Denson-Low

[57] ABSTRACT

Selective reconfiguration of existing spacecraft onboard control and propulsion equipment is provided. The modification combines add-on switch means such as solid state multiplexers or relay banks and rate sensing gyros with existing accelerometers, propulsion control electronics and thrusters. The switch means reconfigure the input circuits and the output circuits of the propulsion control electronics. The switch means select the rate sensing gyro and the liquid apogee motors for control of spacecraft spin axis coning during perigee solid rocket motor firing, and reselects the accelerometer and reaction control thrusters for on-orbit nutation control.

9 Claims, 3 Drawing Sheets

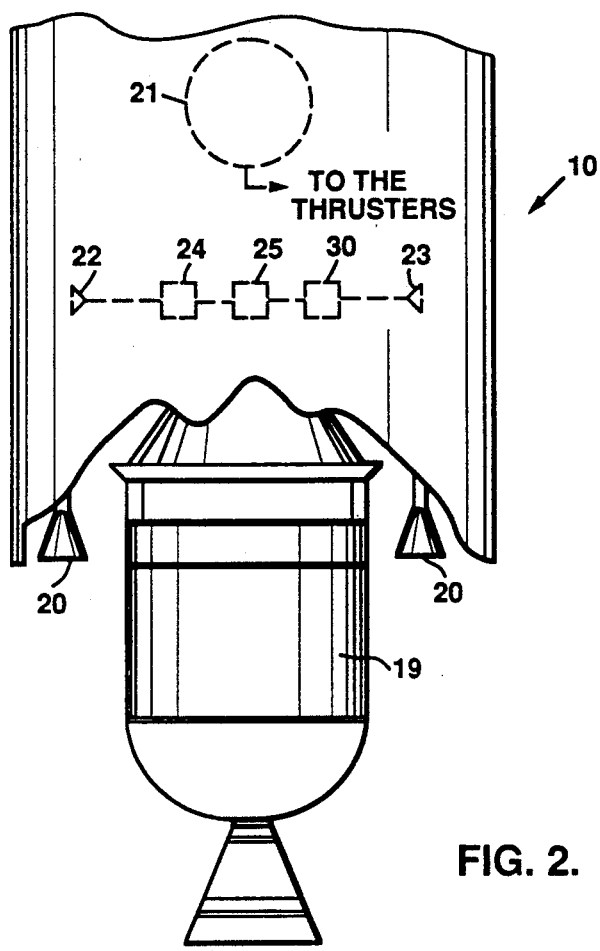
FIG. 2.
FIG. 3.
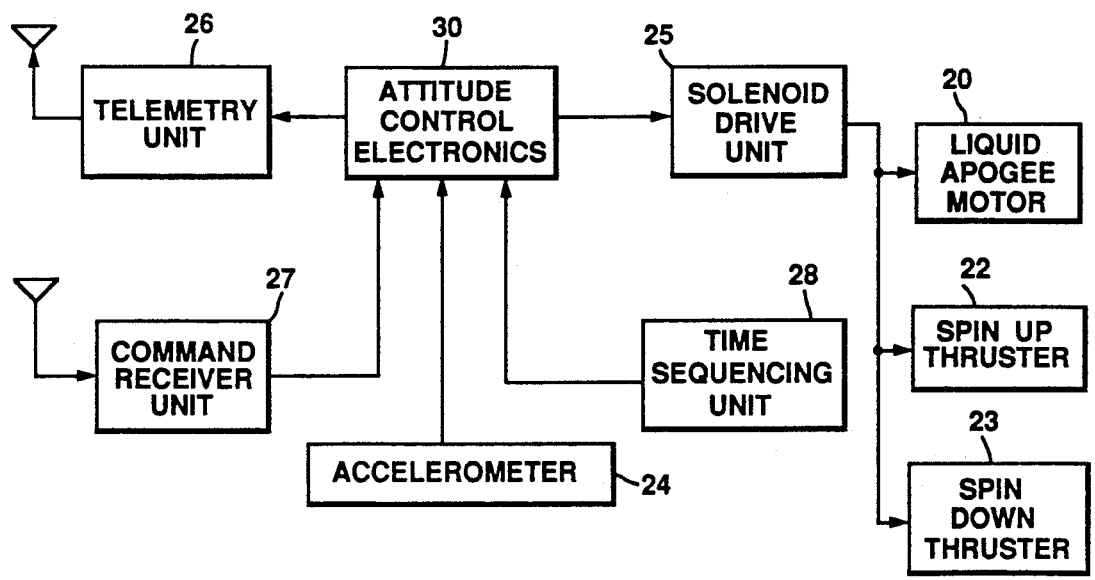

ACTIVE SPIN AXIS CONTROL FOR SPINNING SPACE VEHICLES

BACKGROUND

The present invention relates to spacecraft and solid rocket vehicles and, more particularly, to control of disturbance torques during solid rocket burn for a spinning vehicle.

It is conventional to use multiple-stage rockets for putting artificial satellites into earth orbit. Generally, two stages are used for the initial boost phase to achieve a low orbit outside the Earth's atmosphere. A third stage produces a highly elliptical orbit known as the transfer orbit, and a fourth stage is used when a high altitude circular orbit is required. A solid rocket motor in a spinning vehicle configuration is common for the third and fourth stages, at spin rates of 20 to 60 rpm, typically.

During firing of a spinning solid rocket motor, the spacecraft is often subjected to disturbance torques that cause a coning motion known as nutation. As long as the nutation is small, it is not objectionable because it can be controlled or damped, and there is no danger of the satellite tumbling. However, if the nutation increases to the range between 8 to 15 degrees, there is cause for alarm.

This coning motion is thought to be caused by the motion of the combustion products within the solid rocket motor during firing. One method of controlling this coning is by putting constraints on the manufacturer of the solid rocket motor and on the manufacturer of the spacecraft. The spacecraft mass properties and the solid rocket motor lateral force characteristics can be limited and specified in great detail to prevent or eliminate disturbance torques that cause coning motion.

Another method of compensating for the coning motion is to provide dedicated control and propulsion equipment such as steering nozzles integral with the solid rocket motor that are automatically aimed in a direction that compensates for lateral disturbance torques. Another method is to provide a self-contained external bolt-on package that adds dedicated control and propulsion thrusters to the solid rocket motor for compensating lateral disturbance torques automatically.

It is an objective of the present invention to provide a solution to the problem of nutation during firing of a spinning solid rocket vehicle that also reduces or avoids limitations or constraints on spacecraft mass properties and solid rocket motor lateral force characteristics. Another objective of the present invention is the provision of a solution to the problem of nutation during firing of a spinning solid rocket vehicle that does not require the use of dedicated control and propulsion equipment. Yet another objective of the invention is to provide a solution to the problem of nutation during firing of a spinning solid rocket vehicle that is more efficient in weight and cost than alternative solutions such as those referred to above.

SUMMARY OF THE INVENTION

In accordance with the invention there is provided an apparatus for reconfiguring existing on-board control and propulsion equipment to provide control of spacecraft spin axis orientation during solid rocket motor firing. The perigee motor firing active nutation control subsystem consists of added redundant rate sensors (gyros), switch means such as solid state multiplexers or relay banks, and the electrical wiring necessary to interconnect these with the existing attitude control electronics unit, the existing command electronics unit, the existing telemetry electronics unit, the existing thruster valve drive unit, time sequencing units and spacecraft electrical power, and the solid rocket motor perigee stage. The switch means are controlled by a time sequencing unit and by pulse commands from the ground control station. The switch means in the perigee motor firing active nutation control subsystem determine gyro and thruster signal routing for two states: subsystem configuration enabled (on) and disabled (off). The disabled state is the state that serves all mission requirements other than nutation control during perigee motor firing and is the state that is operational throughout the life of the satellite. At the time of the perigee motor firing, the subsystem is enabled, and the gyro signal is routed into the attitude control electronics unit, leaving the accelerometer temporarily disconnected therefrom. Also in this enabled state, the thruster signals are routed to the solenoid drivers for the liquid apogee motors.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 is a side view of the satellite of FIG. 1, shown broken away and partly in phantom, and illustrating part of the on-board propulsion equipment carried thereby;

FIG. 3 is a simplified block diagram of a conventional on-board control and propulsion system for the satellite of FIGS. 1 and 2.

DETAILED DESCRIPTION

Figure 1:
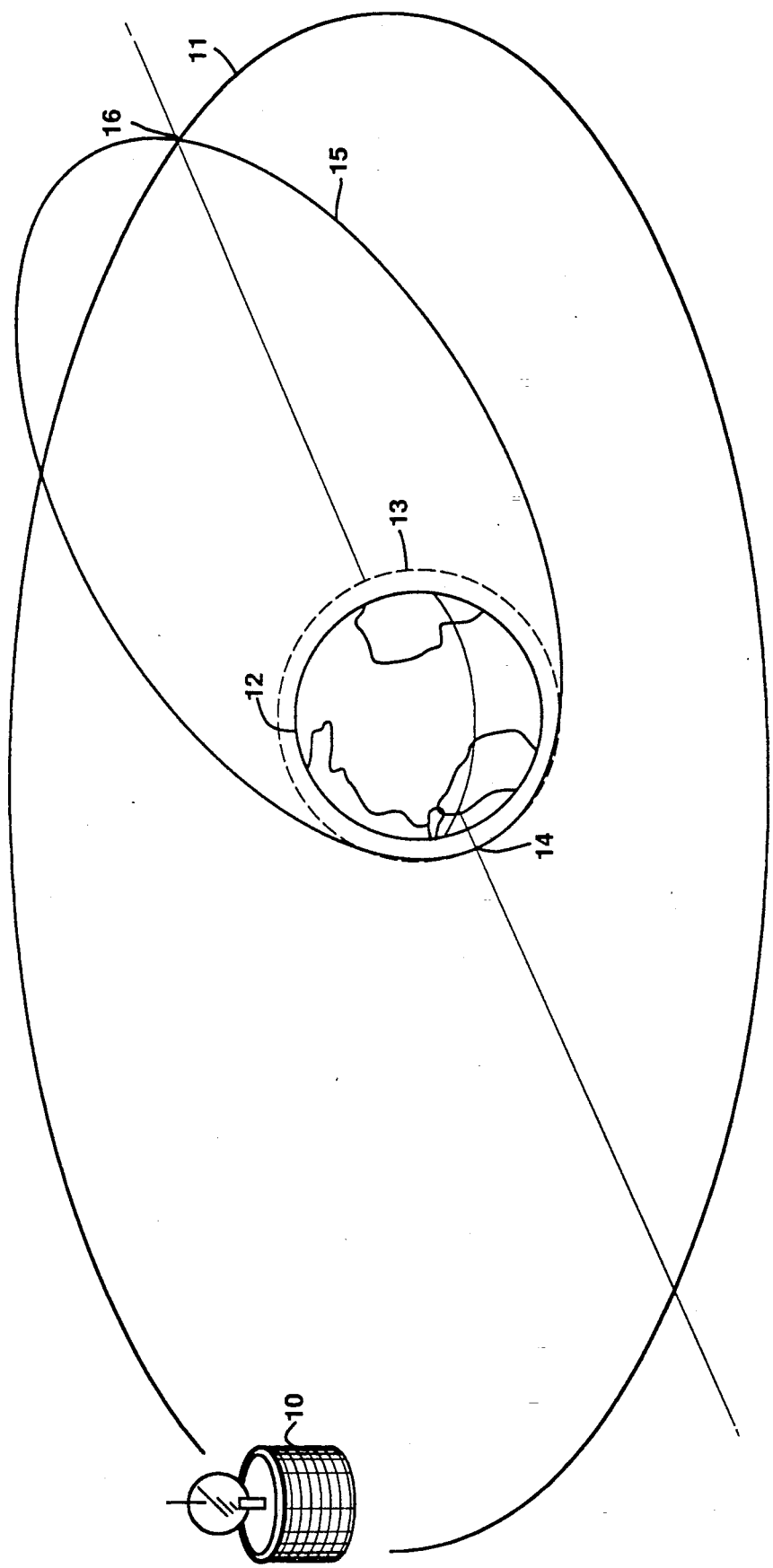
FIG. 1 is a diagram illustrating the injection of an earth satellite into orbit around the earth.

Referring now to the drawings, FIG. 1 is a diagram illustrating the injection of an earth satellite 10 into a geosynchronous orbit 11. The orbit 11 is equatorial and is 22,300 statute miles, or 19,300 nautical miles, above the earth 12. There are several methods of launching an earth satellite 10 into the geosynchronous orbit 11. The launch vehicles available include the Thor Delta, Atlas Centaur, Ariane, and Titan III C. When using the Titan III C, for example, the satellite 10 is first boosted to a low orbit 13 a few hundred miles above the earth 12. This low orbit 13 is typically a nominal 160 nautical miles above the earth 12 with an orbit inclination of 28.6 degrees when the launch is due East from Kennedy Space Center at Cape Canaveral, Florida. To place the spacecraft 10 in geosynchronous orbit 11, a solid rocket motor is fired at the perigee 14 of a transfer orbit 15, and liquid apogee motors are fired at the apogee 16 of the transfer orbit 15.

Referring now to FIG. 2, the satellite 10 typically is provided with a perigee solid rocket kick motor 19 and with on-board control and propulsion equipment that includes at least two liquid apogee motors 20, at least one fuel tank 21, at least one radial spin up reaction control thruster 22, and at least one radial spin down reaction control thruster 23. The spin up thruster 22 and spin down thruster 23 have nozzles aligned tangentially transverse to the spin axis, and are pointed in opposite directions. The liquid apogee motors 20, the spin up thruster 22, and the spin down thruster 23 include solenoid valves that are connected by tubing to the fuel tank 21. The satellite 10 is also equipped with an accelerometer 24, a solenoid drive unit 25, and an attitude control electronics unit 30. Referring now to FIG. 3, the satellite 10 is also equipped with a telemetry unit 26, a command receiving unit 27, and a time sequencing unit 28. More than one of each of the foregoing elements may be provided on board the satellite 10 to permit redundant operation which provides for a more reliable satellite 10.

It should be understood that the liquid apogee motors 20, the spin up thruster 22, and the spin down thruster 23 are usually not operated during the transfer orbit 15 in conventional systems. However, in accordance with the principles of the present invention, apparatus is provided for reconfiguring the existing on-board control and propulsion equipment to permit automatic nutation control during solid rocket motor firing. That is to say, the liquid apogee motors 20, are operated selectively in a predetermined manner during the perigee kick solid rocket motor burn in the transfer orbit 15. This mode of operation is provided to correct for spin-axis coning caused by disturbance torques produced during the solid rocket motor firing.

Figure 4:
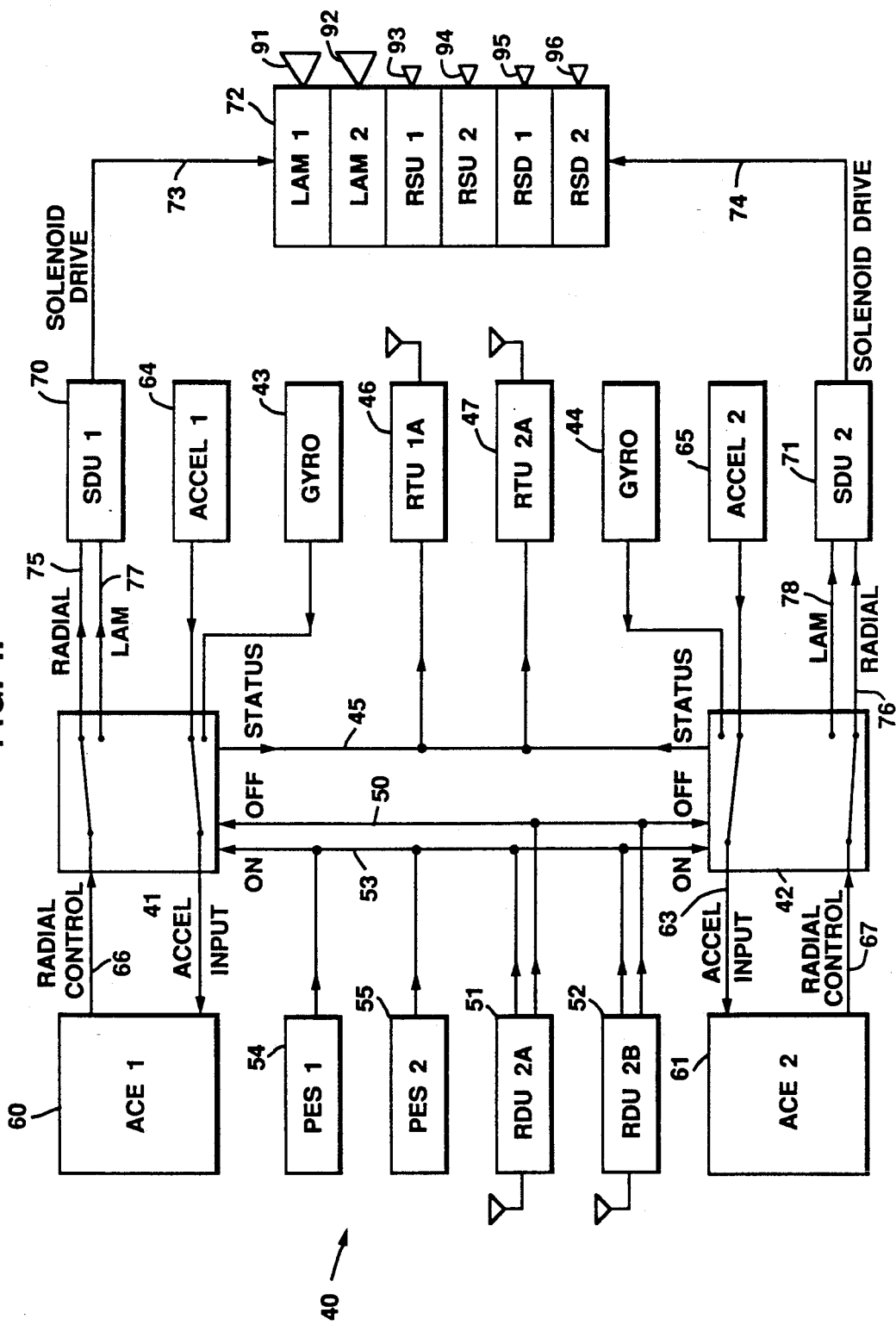
FIG. 4 is a simplified block diagram of a redundant on-board control and propulsion system that has been modified in accordance with the invention.

FIG. 4 is a block diagram showing an exemplary embodiment of a satellite onboard propulsion and control system that has been modified in accordance with the principles of the present invention. The exemplary satellite propulsion and control system has been illustrated in a general manner to show the unit interconnection scheme and the functional relationship between elements. FIG. 4 shows the addition of apparatus for reconfiguring existing on-board control and propulsion equipment for control of spacecraft spin axis orientation during solid rocket motor firing. The added apparatus selects rate sensing elements and one type of propulsion components for control during solid motor firing and reselects other sensing elements and other propulsion components for control during other mission phases.

The overall subsystem is referred to as a Perigee Motor Firing Active Nutation Control, or PANC 40. All of the elements of the PANC 40 are redundant to provide reliable operation. The added components are mounted on the spacecraft and comprise first and second switch means 41, 42 and first and second rate sensing gyros 43, 44. The switch means 41, 42 may be solid state multiplexers or banks of relays, or the like. The gyros 43, 44 are mounted in such a way that they are adapted to sense the rate of coning motion of the spin axis of the spacecraft. The switch means 41, 42 are shown in the disabled state which is functionally equivalent to the control subsystem in a space vehicle that has not been modified in accordance with the invention. The only other added item is the new wiring necessary to integrate the added components with the existing on-board propulsion and control system.

A status line 45 connects the switch means 41, 42 to first and second telemetry unit 46, 47, which telemeter status signals to a ground control station. The switch means 41, 42 are adapted to receive an "off" signal via control lines 50 from first and second command receiver units 51, 52 that receive control signals from the control station. The switch means 41, 42 are adapted to receive an "on" signal via control lines 53 from the command receiver units 51, 52, or alternatively, from first and second time sequencer units 54, 55. The PANC 40 includes first and second attitude control electronics units 60, 61 which are conventionally used in satellites such as Intelsat VI, for example, and are not modified in any way. Instead, the electrical harnessing interconnecting the existing units is modified to produce new paths for signal and control lines switched by the switch means 41, 42, and to provide new paths for control and status signals.

The attitude control electronics units 60, 61 conventionally receive sensor input signals on first and second accelerometer input lines 62, 63. In an unmodified spacecraft, those input signals would always be provided by first and second accelerometers 64, 65. In the exemplary embodiment of a spacecraft modified in accordance with the present invention, the first accelerometer input line 62 is connected to the output of the first switch means 41. Signals from the first accelerometer 64 and from the first rate sensing gyro 43 are connected to the input of the first switch means 41. When the first switch means 41 is in the "off" or PANC disabled state, the output of the first accelerometer 64 is connected to the input of the first attitude control electronics unit 60. However, when the first switch means 41 is in the "on" or PANC enabled state, the first accelerometer 64 is disconnected, and the first rate sensing gyro 43 is connected to the input of the first attitude control electronics unit 60. Of course, the redundant units, namely, the second attitude control electronics unit 61, the second switch means 42, the second accelerometer 65, and the second rate sensing gyro 44 operate in a corresponding manner.

The output control signal from the attitude control electronics units 60, 61 is applied to the first and second switch means 41, 42 by first and second output control lines 66, 67. First and second solenoid drive units 70, 71 provide control for the entire propulsion and thruster system 72, which comprises first and second liquid apogee motors 91, 92, and first and second radial spin up reaction control thrusters 93, 94, and first and second radial spin down reaction control thruster 95, 96. The first solenoid drive unit 70 is connected to the propulsion and thruster system 72 by a first solenoid drive bus 73, while the second solenoid drive unit 71 is connected to the propulsion and thruster system 72 by a second solenoid drive bus 74.

The first solenoid drive unit 70 has radial thruster input lines 75 connected to one output of the first switch means 41, and has LAM thruster input lines 77 connected to another output of the first switch means 41. Similarly, the second solenoid driver unit 71 has radial thruster input lines 76 connected to one output of the second switch means 42, and has LAM thruster input lines 78 connected to a different output of the second switch means 42.

In operation, the PANC 40 permits strong nutation damping during perigee kick motor burn. The switch means 41, 42 determine the routing of input signals and output signals for the attitude control electronics units 60, 61 for two states: PANC "on" or enabled; and PANC "off" or disabled. When the PANC 40 is "on" or enabled, a nutation signal from the gyros 43, 44 reaches the attitude control electronics units 60, 61. These units 60, 61 interpret the nutation signal and sends thruster firing signals to the liquid apogee motors 91, 92. With the PANC 40 in the "on" or enabled state, the signal from the gyros 43, 44 is routed into the attitude control electronics units 60, 61 via the accelerometer input lines 62, 63, leaving the accelerometers 64, 65 temporarily disconnected from the attitude control electronics units 60, 61. Also in the "on" or enabled state, the radial spin thruster control signals appearing at the output control lines 66, 67 of the attitude control electronics units 60, 61 are routed to the liquid apogee motor inputs of the solenoid drive units 70, 71 causing firing of the liquid apogee motors 91, 92. These input signal and output signal routings permit the attitude control electronics units 60, 61 to serve the PANC function even though the stock attitude control electronics units 60, 61 are originally designed to receive input signals from the accelerometers 64, 65, and are designed to fire the reaction control thrusters 93, 94, 95, 96 for on-orbit nutation control.

In the "off" or PANC disabled state, the signals from the accelerometers 64, 65 are connected to the input of the attitude control electronics units 60, 61, and the gyros 43, 44 are disconnected. In the "off" or PANC disabled state the radial spin thrusters control signals are connected to the radial spin thrusters inputs of the solenoid drive units 70, 71. Accordingly, the control of the radial thrusters 93, 94, 95, 96 and the liquid apogee motors 91, 92 is restored to the original configuration. Hence, the PANC 40 when in the "off" or disabled state is functionally equivalent to the control and propulsion system in a space vehicle which has not been modified in accordance with the invention. Although not indicated in FIG. 4, the switch means 41, 42 also control the on/off state of the electronics and mechanism in the gyros 43, 44. In addition, the gyros 43, 44 are permanently disconnected from the power bus upon perigee stage separation.

Switch means in the perigee motor firing active nutation control subsystem determine gyro and thruster signal routing for two states: subsystem configuration enabled (on) and disabled (off). The disabled state of the perigee motor firing active nutation control subsystem constitutes a satellite configuration that serves all mission requirements other than nutation control during perigee motor firing. This is the state that is selected throughout the operational life of the satellite. This state makes the satellite functionally equivalent with other satellites of the same series which lack the modified subsystem of the present invention. In this state an accelerometer signal is processed in an attitude control electronics unit, which determines and generates reaction control thruster firing control signals as necessary to damp any measured nutation exceeding a given threshold. At the time of the perigee motor firing, the attitude control electronics unit is internally configured to send thruster control signals to the reaction control thrusters. Neither the accelerometer, as a sensing device, nor the reaction control thrusters, as actuator devices, are adequate to implement the desired control during the perigee motor firing. When the subsystem is enabled, the gyro signal is routed into the attitude control electronics unit, leaving the accelerometer temporarily disconnected therefrom. Also in this enabled state, the reaction control thruster outputs are routed to the thruster valve drive unit solenoid drivers for the liquid apogee motors. These signal routings permit the attitude control electronics unit to serve the perigee motor firing active nutation control subsystem function even though it is designed to receive as an input the accelerometer signal and use the reaction control thrusters for on-orbit nutation control.

BACKGROUND AND TEST RESULTS

Two Intelsat VI satellites were modified in accordance with the invention, namely the F3 model and the F4 model. The total weight added was 18 lbs. Electronic units and wiring harnesses were built and tested separately, then integrated into the satellites and tested as a system. The nutational motion of the satellite in space was electrically simulated and the function of the invention was verified. Subsequently, the F3 and F4 models were launched on Mar. 14, 1990 and Jun. 23, 1990 respectively. Flight data was obtained from the F4 mission and proper function of the invention was verified. The F3 launch vehicle failed, preventing operation of the invention.

Thus there has been described a new and improved thruster actuated spin axis control for a spinning solid rocket vehicle. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An apparatus for controlling the attitude of a spacecraft having a payload with an apogee motor for driving said payload from a transfer orbit to an operational orbit and a detachable perigee boost stage with a perigee motor for driving said payload from a low orbit to a transfer orbit, wherein said spacecraft spins during operation of said perigee motor, said apparatus comprising:
    a first attitude disturbance sensor on said spacecraft for providing an indication of spacecraft spin axis disturbance during firing of said perigee motor;
    a second attitude disturbance sensor on said spacecraft for providing an indication of attitude disturbance when said perigee motor is not firing;
    an attitude control thruster for adjusting the attitude of said spacecraft;
    an attitude control electronic unit for receiving disturbance indications from said first and second sensors and for generating control signals for compensating for indicated disturbances in response thereto;
    a first switch for coupling said apogee motor to said electronic unit during firing of said perigee motor so that said apogee motor compensates for spin axis disturbances detected by said first sensor; and
    a second switch for coupling said attitude control thruster to said electronic unit when said perigee motor is not firing so that said thruster compensates for disturbances detected by said second sensor.

2. The apparatus of claim 1 in which said first sensor comprises a rate gyro.

3. The apparatus of claim 1 in which said second sensor comprises an accelerometer.

4. The apparatus of claim 1 in which said second propulsion device comprises reaction control thrusters.

5. The apparatus of claim 1 in which said switches comprises relays.

6. The apparatus of claim 1 in which said switches comprise a solid state multiplexer.

7. A method for controlling the attitude of a spacecraft having a payload with an apogee motor for driving said payload from a transfer orbit to an operational orbit and a detachable perigee boost stage with a perigee motor for driving said payload from a low orbit to a transfer orbit, wherein said spacecraft spins during operation of said perigee motor, said method comprising:

provuding an indication of spin axis disturbance during firing of said perigee motor using a first attitude disturbance sensor on said spacecraft;

providing an indication of attitude disturbance when said perigee motor is not firing using a second attitude disturbance sensor on said spacecraft;

receiving disturbance indications from said first and second sensors at an attitude control electronic unit and generating control signals in said attitude control electronic unit for compensating for indicated disturbances in response to said indications;

coupling said apogee motor to said electronic unit so that said apogee motor compensates for spin axis disturbances detected by said first sensor during firing of said perigee motor; and coupling an attitude control thruster to said electronic unit when said perigee motor is not firing so that said thruster compensates for disturbances detected by said second sensor.

8. The method of claim 7 in which said step of receiving indications from said first sensor comprises receiving indications from a rate sensing gyro.

9. The method of claim 7 in which said step of receiving indications from said first sensor comprises receiving indications from an acceleration sensor.

* * * * *